(12) United States Patent
McCown et al.

(10) Patent No.: US 7,341,422 B1
(45) Date of Patent: Mar. 11, 2008

(54) CONTAINER TRANSPORTATION SYSTEM AND METHOD

(75) Inventors: John D. McCown, New York, NY (US); Malcolm P. McLeon, New York, NY (US)

(73) Assignee: Trailer Bridge, Inc., Jacksonville, FL (US)

( * ) Notice: Subject to any disclaimer, the term of this patent is extended or adjusted under 35 U.S.C. 154(b) by 0 days.

(21) Appl. No.: 09/057,313

(22) Filed: Apr. 8, 1998

(51) Int. Cl.
*B65G 67/60* (2006.01)
(52) U.S. Cl. .................................. 414/803; 414/140.1
(58) Field of Classification Search ............. 414/139.4, 414/139.8, 140.1, 143.1, 143.2, 139.9, 803; 220/1.5; 410/82; 206/82.1
See application file for complete search history.

(56) References Cited

U.S. PATENT DOCUMENTS

| 45,039 | A | | 11/1864 | Heath | |
|---|---|---|---|---|---|
| 67,031 | A | * | 7/1867 | Des Corats | .............. 414/140.1 |
| 154,978 | A | | 9/1874 | Baxter et al. | |
| 241,813 | A | | 5/1881 | McDougall | |
| 304,581 | A | * | 9/1884 | Teubert | |
| 2,405,893 | A | | 8/1946 | Leftwich | ..................... 214/15 |
| 2,451,198 | A | * | 10/1948 | Burke | |

(Continued)

FOREIGN PATENT DOCUMENTS

AU 0142974 * 8/1951 .............. 414/139.4

(Continued)

OTHER PUBLICATIONS

Kalmar web site, http://web.archive.org/19980415081436/www.kalmarind.com/e_default.html, Mar. 27, 1998.*

(Continued)

*Primary Examiner*—Gerald J. O'Connor
(74) *Attorney, Agent, or Firm*—Thompson Hine LLP

(57) ABSTRACT

A container transportation system and method which includes a number of enclosed containers adapted to contain freight and protect the freight in a marine environment, a vehicle adapted to lift, transport, orient and place the containers on a support surface, a marine vessel having a container storage deck with sufficient strength to support the vehicle when the vehicle is transporting a fully loaded one of the containers, and a ramp shaped to extend from an associated dock to the deck and having sufficient strength to support the vehicle when the vehicle is transporting a fully loaded one of the containers, and having sufficient strength such that an angle of inclination of the ramp suspended between the deck and an associated dock allows the vehicle to traverse the ramp without slipping. The vehicle engages a single one of the containers on the associated dock, then proceeds to transport the container over the ramp to desired, predetermined locations on the deck for transportation by the marine vessel. In a preferred embodiment, the containers include corner castings and the system includes twistlocks which interconnect the corner casings of the containers, and attach the containers to the deck, thereby eliminating the need for lashing and other securing devices. When the marine vessel carrying the containers reaches the port of destination, the process is reversed, with the lifting vehicle removing the containers from a stacked configuration on the deck, transporting them over a ramp extending between the deck and an associated dock, and stacking or otherwise storing the containers on the dock. Also in the preferred embodiment, the vehicle is a reach stacker.

39 Claims, 4 Drawing Sheets

U.S. PATENT DOCUMENTS

| | | | |
|---|---|---|---|
| 2,490,610 A | 12/1949 | Andersen | 212/134 |
| 2,637,453 A * | 5/1953 | Cleveland | |
| 2,672,840 A | 3/1954 | Sharp et al. | 114/70 |
| 2,884,870 A | 5/1959 | Day | 105/27 |
| 3,124,209 A | 3/1964 | Flipse | 180/7 |
| 3,165,211 A * | 1/1965 | Ablett et al. | |
| 3,389,775 A | 6/1968 | Sause, Jr. | 198/1 |
| 3,460,686 A | 8/1969 | Cole | 214/14 |
| 3,514,002 A * | 5/1970 | Allegri et al. | |
| 3,591,023 A * | 7/1971 | Allen | 414/140.1 |
| 3,691,595 A * | 9/1972 | Backterman et al. | 220/1.5 |
| 3,794,196 A * | 2/1974 | Terho et al. | 414/458 |
| 3,846,860 A * | 11/1974 | Kummerman | |
| 3,919,959 A * | 11/1975 | Nemec et al. | 114/26 |
| 4,135,468 A * | 1/1979 | Kirby et al. | 114/260 |
| 4,201,511 A * | 5/1980 | Charles | 414/738 |
| 4,325,667 A * | 4/1982 | Freeman | 414/139 |
| 4,400,130 A * | 8/1983 | Anttila et al. | 414/478 |
| 4,441,449 A * | 4/1984 | Biaggi | 114/263 |
| 4,482,285 A * | 11/1984 | Copie | 414/589 |
| 4,552,082 A * | 11/1985 | Grey | 110/238 |
| 4,626,155 A * | 12/1986 | Hlinsky et al. | 410/82 |
| 4,803,940 A * | 2/1989 | Ebeling et al. | 114/72 |
| 4,898,112 A | 2/1990 | McGlew et al. | 114/225 |
| 5,370,435 A * | 12/1994 | Monk et al. | 394/81.54 |
| 5,467,855 A * | 11/1995 | Sorensen | 193/5 |
| 5,488,918 A | 2/1996 | Johnson, Jr. et al. | 114/56 |
| 5,618,148 A | 4/1997 | Iversen et al. | 414/139.9 |
| 5,780,826 A * | 7/1998 | Hareyama et al. | 235/385 |
| 6,105,525 A * | 8/2000 | Rapeli | 114/72 |
| 6,309,153 B1 * | 10/2001 | Petzitillo et al. | 410/73 |
| 6,390,742 B1 * | 5/2002 | Breeden | 410/77 |
| 6,416,264 B2 | 7/2002 | Heim et al. | |
| 6,503,034 B2 | 1/2003 | Heim et al. | |
| 6,890,136 B2 | 5/2005 | Heim et al. | |
| 6,893,205 B2 | 5/2005 | Heim et al. | |
| 2002/0009346 A1* | 1/2002 | Holt et al. | 410/94 |

FOREIGN PATENT DOCUMENTS

| | | | | |
|---|---|---|---|---|
| DE | 19743871 | * | 4/1999 | |
| GB | 2107651 A | * | 5/1983 | |
| JP | 360015284 | * | 1/1985 | |
| JP | 016983 | * | 7/1987 | 414/139.4 |
| JP | 405338816 | * | 12/1993 | 414/139.4 |

OTHER PUBLICATIONS

Marcos International Website printout, http://www.marcon.com/marcon2s.cfm?SectionGroupID=20&PageID.*

Korea Ship Broking com website printout, http://koreaship.com/source/english/others1.htm.*

"Corner Castings" by Buffers USA (dated as late as Mar. 16, 1998).

Untitled Publication by Kalmar (dated as late as Aug. 7, 1997).

Photograph and caption in the publication "Of Commerce" (Jan. 26, 1998).

"A shipping alternative," published in Maritime News & Shipcards (Mar. 30, 1998).

Press Release by Trailer Bridge, Inc. (Jan. 21, 1998).

* cited by examiner

CONTAINER TRANSPORTATION SYSTEM AND METHOD

BACKGROUND

The present invention relates to containerized freight transportation systems and methods and, more particularly, containerized freight transportation systems incorporating a marine vessel such as a barge.

Transportation of containerized freight has proven to be efficient and cost-effective when utilized in a marine environment. It is now quite common for barges and freighters, the latter more specifically named container ships, to transport containerized cargo. Typically, the cargo is first stowed within enclosed, sealable metal containers which are made in standardized lengths, such as 40 feet, and having standardized width and height dimensions. Once filled with cargo at a customer's location, the containers are sealed and transported by tractor trailer or rail to a marine terminal, where they are loaded upon a barge or container ship by container cranes.

Container cranes are relatively expensive, typically costing several million dollars each. Such cranes typically comprise an elevated bridge or superstructure mounted on rails set in the marine terminal. The bridge supports a boom which is sufficiently elevated to allow the marine vessel to be loaded or unloaded to sail and moor beneath it. The container crane includes a carriage movably mounted on the boom having a winch which lifts containers singly from the dock between the support legs of the superstructure, transports them to a desired position above the load deck of the vessel, then lowers the containers to a preselected location. Marine vessels loaded in this fashion typically transport containers stacked several containers high, or in greater stacks. Once the containers have been stacked on the load deck, they may be lashed into position by a series of cables which are attached to the deck. Containers stored below the weather deck of the marine vessel typically are secured in racks which are dimensioned to receive containers of a particular size.

A disadvantage with such a crane system for loading and unloading containers from a marine vessel is that such systems are quite expensive, require extensive site preparation, significant space for erection and significant wharf strength, and can handle only a single container at a time (although some marine terminals have more than one container crane on a set of tracks). Accordingly, there is a need for a system and method of loading, transporting, and unloading containerized cargo from marine vessels which can be implemented and operated at a relatively low cost and does not require significant site preparation or space.

SUMMARY

The present invention is a container transportation system and method which can be used virtually at any marine terminal, requires minimal site preparation, and is relatively inexpensive to implement. The system includes a number of containers, each adapted to contain freight and protect it in a marine environment, a material transporting vehicle adapted to lift, transport, orient and place the containers on a support surface, a marine vessel having a container storage deck with sufficient strength to support the vehicle when the vehicle is transporting a fully loaded one of the containers, and a ramp shaped to extend from an associated dock or wharf to the deck and having sufficient strength to support the vehicle when the vehicle is transporting a fully loaded one of the containers.

In a preferred embodiment, the containers are 53 feet long, 8.5 feet wide and 9.5 feet high and are constructed of aluminum in order to maximize their cargo capacity. Each container includes corner fittings on all eight corners of the container, and the containers are secured to the deck by semi-automatic twistlocks. Furthermore, twistlocks are used to secure the containers to each other in a stacked relation. Consequently, the need for cable lashings and other means of securement is eliminated. This elimination of lashings not only reduces the cost of materials required to secure the containers on the vessel, but greatly reduces the time required to load and unload containers.

The ramp of the preferred embodiment is sized to allow the vessel to be accessed by the vehicle in all tidal and load conditions. The ramp preferably includes a pivotable foot which is inclined to provide a smooth transition to the ramp from the terminal, and a downwardly-extending lip which engages a rail on the deck of the vessel, to effect a secure, low profile construction.

Also in the preferred embodiment, the material transportation vehicle is a reach stacker which is capable of securing a single container to the spreader attachment of a telescoping boom which includes an hydraulic pivot so that the container can be rotated and inclined, as well as raised and lowered. This multi-degree range of movement enables the reach stacker to lift containers from a storage position on the associated terminal, transport them over the ramp to the container storage deck, and then properly orient the containers to engage the deck mounted twistlocks and stack the containers.

In the preferred embodiment, the marine vessel is a barge whose deck has been reinforced to support the weight of the reach stacker and container as it is being positioned on the deck. The beam to length ratio of the barge is selected to provide sufficient stability for the reach stacker to transport containers on the deck of the barge. Also in the preferred embodiment, the barge has a pointed bow, which enables it to be towed at a greater speed for a given horsepower tug.

The method of the present invention begins with the act of loading the containers aboard the marine vessel. After the barge has been moved alongside a wharf or terminal, the ramp is positioned to extend from the dock to the marine vessel. In a preferred embodiment, the vessel is a barge having a single container storage deck and a continuous rail extending along the starboard edge of the deck. The ramp includes a downwardly-extending extension or lip that engages the rail and thereby secures the ramp at any desired location along the length of the vessel. The reach stacker secures a container from a truck chassis or railcar to its spreader attachment, then transports the container over the ramp to the storage deck of the associated barge. Once on the deck of the barge, the reach stacker transports the container to a preselected location on the deck. In the preferred embodiment, this location includes twistlocks mounted in slots on the deck and positioned to receive the bottom corner fittings of the container. This process is repeated by the reach stacker until all of the desired containers have been loaded and secured aboard the marine vessel. When the marine vessel arrives at the destination port, the process is reversed, with the reach stacker removing the containers from the deck and either placing them in storage on the dock, or placing them on vehicles, such as tractor trailers.

Accordingly, it is an object of the present invention to provide a container transportation system and method which is relatively inexpensive to implement; a container transportation system and method which does not require extensive terminal preparation; a container transportation system and method which can be carried out efficiently to minimize the turnaround time of a marine container transportation vessel; and a container transportation system and method which is reliable.

Other objects and advantages of the present invention will be apparent from the following description, the accompanying drawings and the appended claims.

DETAILED DESCRIPTION

Figure 1:
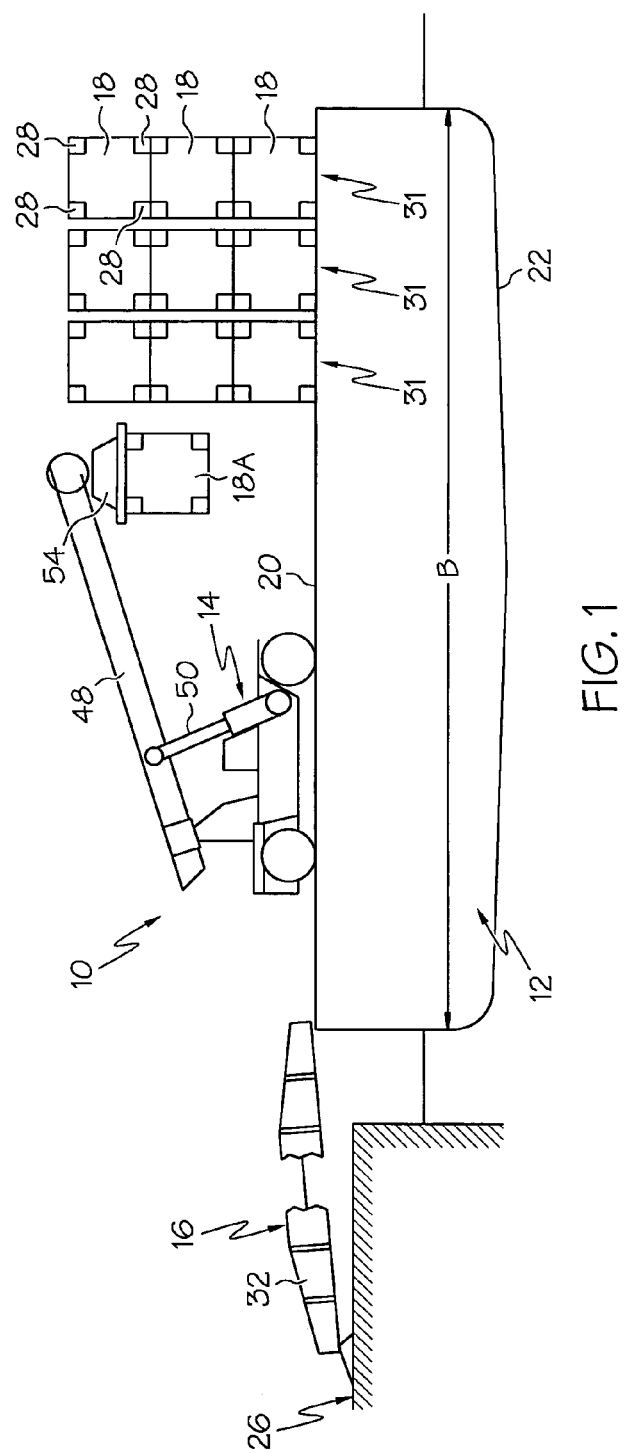
FIG. 1 is a schematic, front elevation of the container transportation system of the present invention.

As shown in FIG. 1, the container transportation system of the present invention, generally designated 10, includes a specially designed barge 12, a reach stacker 14, a ramp 16, and a plurality of containers 18. The barge 12 includes a cargo deck 20 which is reinforced sufficiently to support the weight of the reach stacker 14 when carrying a container 18A which is fully loaded. In the preferred embodiment, the deck strength of the barge 12 is approximately 1,750 pounds per square feet, which is several times that of a typical commercial roll-on, roll-off vessel. The barge 12 is dimensioned such that the reach stacker 14 can move about all parts of the deck 20 and stack the containers 18 on the deck (see also FIG. 2) without the barge listing to the side an undesirable amount. Preferably, the barge 12 has a beam B which is approximately ¼th the length L (see FIG. 2) of the barge. This is approximately two times that of a typical ocean going vessel. In addition, the hull 22 of the barge 12 differs from traditional barge design in that it includes a pointed bow 24. This bow shape, in combination with the beam to length ratio of the hull 22, enables the barge 12 to be towed at speeds up to 50% above those of similar sized barges with the same horsepower tug, which results in faster transit time.

Figure 2:
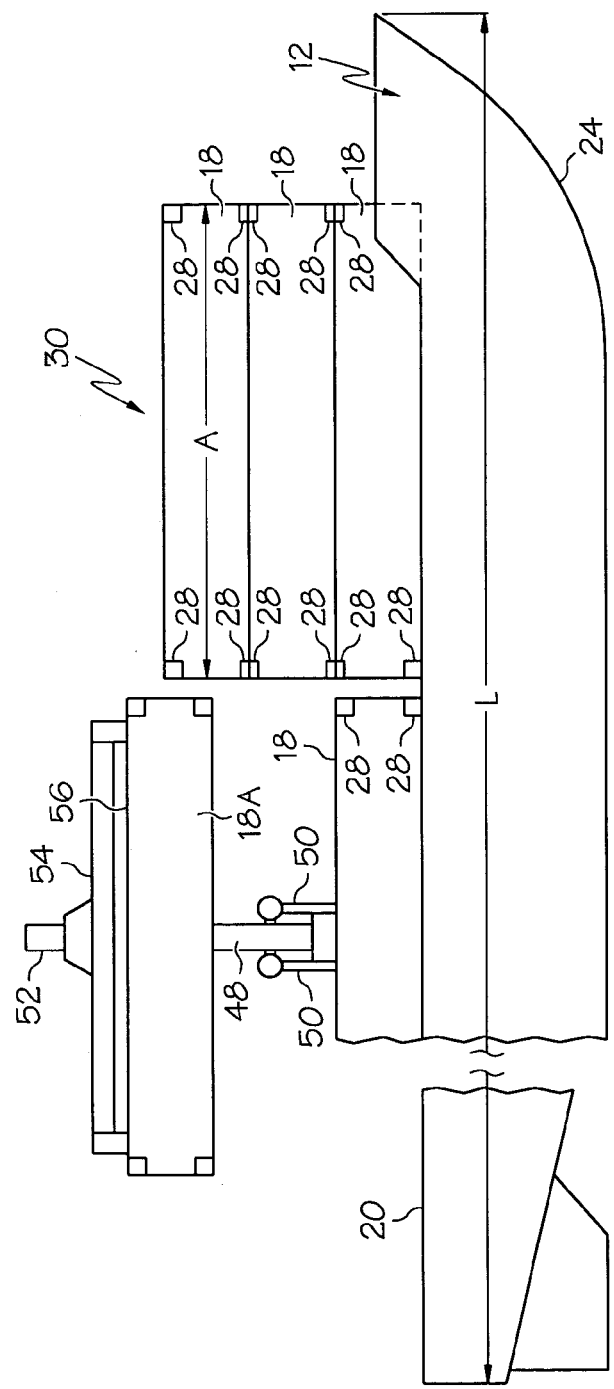
FIG. 2 is a side elevation of the transportation system of FIG. 1.
Figure 5:
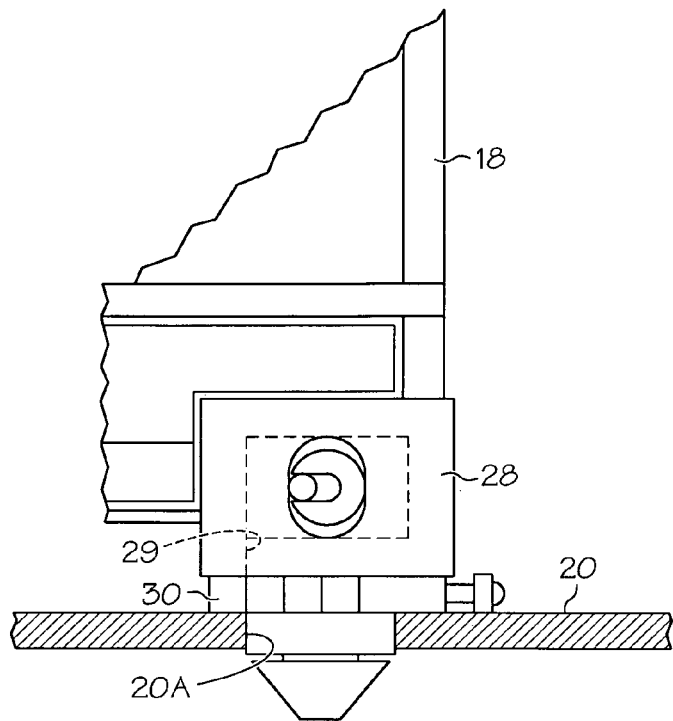
FIG. 5 is a detail showing a typical container, corner fitting and twistlock attaching the container to a deck.

As shown in FIG. 2, each container 18 is generally of conventional design, being for use in a marine environment. However, the containers 18 have been modified to have a length A of approximately 53 feet. This enables the containers 18, when transported on a tractor-trailer chassis (not shown) to and from the marine terminal, which can be a wharf or dock 26 (see FIG. 1), to have cargo capacity similar to high cube trailers operated by typical trucking companies. In addition, each container 18 includes corner castings 28 attached to each corner. As shown in FIG. 5, each corner casting 28 has a bottom opening 29 shaped to receive a semi-automatic double cone twistlock 30. Also as shown in FIG. 5, a twistlock 30 preferably is used to secure a container 18 to the cargo deck 20. To accomplish this, a plurality of slots 20A are formed in the cargo deck so that the twistlock 30 can be used to secure a container 18 to the deck 20.

Figure 6:
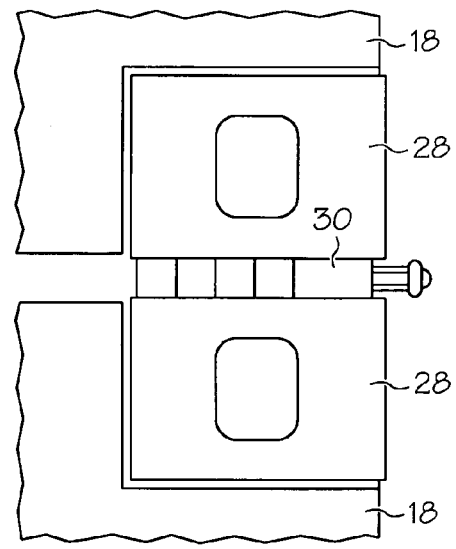
FIG. 6 is a detail showing a typical connection between containers.

In addition, as shown in FIG. 6, twistlocks 30 are used to interconnect the containers 18 and are interposed between adjacent pairs of corner castings 28. In the preferred embodiment, the twistlocks 30 are model C5AM-DF double cone semi-automatic twistlocks, manufactured by Buffers USA of Jacksonville, Florida. The corner castings are also manufactured by Buffers USA and are standard ISO type. Use of corner casting 28 and twistlock 30 combinations to secure the containers 18 to each other and to the cargo deck 20 enables the containers to be secured in stacks 31 (see FIGS. 1 and 2) with very little spacing in between, typically approximately two feet lengthwise and 3 inches widthwise. In addition, the use of the corner castings 28 and twistlocks 30 eliminates the need for conventional means of securing the containers 18 in a stacked relation, such as racks or cable lashings.

The reach stacker 14 (FIGS. 1 and 2) transports containers 18 from the marine terminal 26 to the barge 12 over a ramp 16. The ramp 16 is reinforced to support the weight of the reach stacker 14 and a fully loaded container 18A which it carries. The ramp 16 includes high steel sidewalls 32 (see also FIG. 4) for safety in poor visibility conditions. The ramp 16 preferably is approximately 75 feet in length, which reduces the angle of inclination of the ramp from the wharf 26 to the cargo deck 20 sufficiently to enable the reach stacker to transport containers 18 without slipping. Traction is enhanced by including heavy square bar chevrons on the floor 33 of the ramp (see FIG. 3). The enhanced traction capabilities of the floor 33, combined with the length of the ramp 16, enable the reach stacker 14 to access the barge 12 in all tidal and load conditions, even when the barge is unloaded and at high tide.

Figure 3:
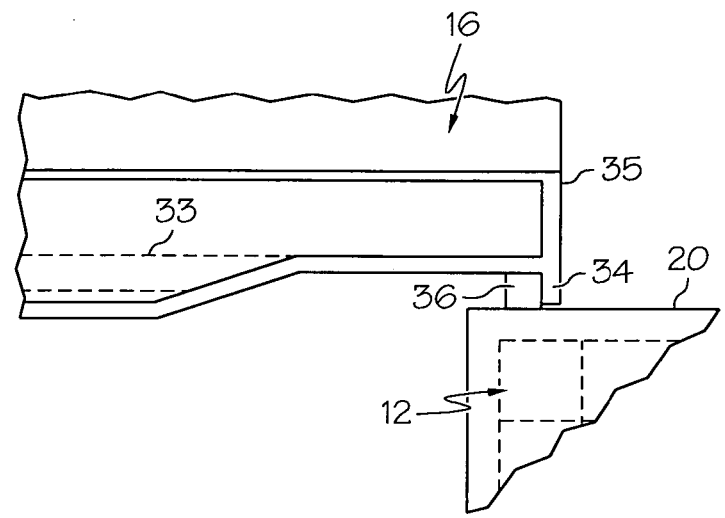
FIG. 3 is a detail of the ramp and deck interconnection of the system of FIG. 1.

As shown in FIG. 3, the ramp 16 includes a downwardly depending lip extension 34 at its front end 35. The extension 34 is shaped to engage a longitudinal rail 36 which is attached to the cargo deck 20, preferably by welding or other conventional means, and which extends substantially the entire length L of the barge 12. The front end 35 of the ramp 16 is lowered onto the deck 20 such that the extension 34 engages and is retained by the rail 36. This structure allows the ramp to terminate immediately adjacent to the edge of the deck 20, but insures that the ramp 16 will not slide sidewardly off of the deck. The barge 12 includes steel bar reinforcing 37 to properly distribute the weight of the ramp 16.

Figure 4:
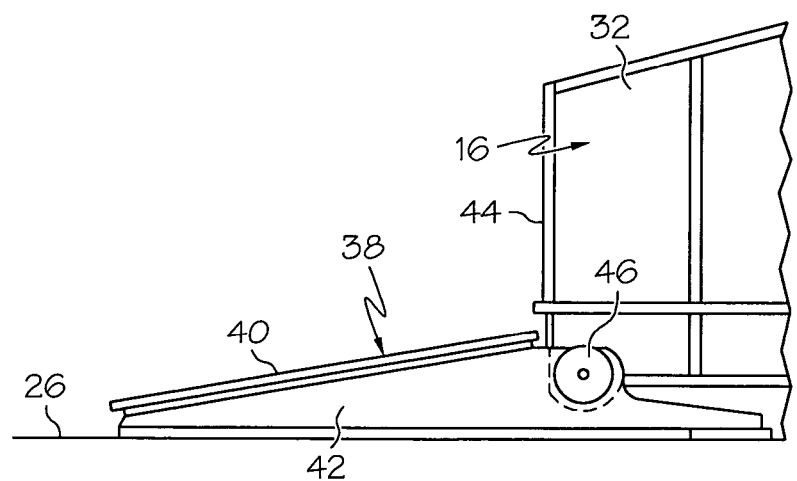
FIG. 4 is a detail of the dock side support foot of the ramp of FIG. 3.

As shown in FIG. 4, in order to ease the transition from the terminal 26 to the ramp floor 33 (FIG. 3), the ramp 16 includes a pivotal foot, generally designated 38. The foot 38 includes an upper, inclined surface 40 which is mounted on support gussets 42. The entire structure is attached to the rear end 44 of the ramp 16 by a pivot 46.

The reach stacker 14 preferably is a conventional reach stacker, such as model DRD420-60S5 manufactured by Kalmar, and includes a telescopic boom 48 (see FIGS. 1 and 2) which is raised and lowered by twin double-acting hydraulic cylinders 50. The boom 48 terminates in a hydraulically operated swivel 52 connected to a spreader attachment 54. The spreader attachment 54 is adapted to engage receptacles (not shown) formed in the top wall 56 of a container 18. Consequently, the reach stacker 14 can lift a container 18 off of a trailer or rail car, and can transport it over the ramp 16 to the cargo deck 20 of the barge. The swivel 52 enables the containers 18 to be positioned freely in the space above the deck and to be positioned in stacks 30.

The reach stacker 14 can stack containers 18 lengthwise, as shown in FIG. 2, or end on, and can load and unload across rows. These features make the reach stacker a desirable alternative to a conventional forklift truck.

The method of the invention is as follows: Containers 18 are delivered to a marine terminal or wharf 26 by tractor-trailer rigs, or by rail. The barge 12 is towed into position by a tow boat (not shown) adjacent to the marine terminal 26 and moored in location by conventional mooring lines. The invention 10 can be used in semi-improved terminals, or even in situations where the barge 12 is moored alongside pilings which are offshore. A reach stacker or mobile lifter is used to position the ramp 16 such that the extension 34 engages the longitudinal rail 36 of the barge 12. Preferably, the ramp 16 is positioned midway between each stack and multiple ramps 16 are used to minimize the need to move ramp 16. A single reach stacker 14 then lifts each individual container 18 from its location in the marine terminal 26 and transports it over the ramp 16 onto the cargo deck 20, where the reach stacker then places the container 18 on the deck 20 such that the corner castings 28 are secured to twistlocks 30 which are already secured within recesses (20A) on the deck in the stacking pattern. Subsequent containers 18 are first fitted with twistlocks 30 on their underside corner castings 28 just after the containers are lifted from their chassis on the terminal 26. All of such twistlocks 30 engage with the weight of the container 18 itself as the container is placed upon a container to form a stack 31.

The reach stacker 14 preferably transports the containers to locations on barge deck 20 directly adjacent to the ramp 16 to minimize maneuvering time. After the loading is complete, the ramp 16 is removed and the barge 12 is then secured to a tow boat which, after the barge has been cast off, tows the barge to its destination. In this loading process, the twistlocks 30 are the only mechanism required to secure the stacks 32 to the deck 20, and to secure the containers 18 to each other; no other lashings or cables of any kind are required. The pointed bow 24 of the barge 12 enables the tow boat to tow the barge at a relatively greater speed than conventional straight-bowed barges.

When the barge reaches its destination, it is moored to the adjacent wharf or dock 26, and the process is reversed. The ramp 16 is attached to the rail 36 of the deck 20, and the reach stacker removes the containers 18 one by one from the deck. The twistlocks 30 are tripped to release the containers 18 from engagement with each other an with the deck 20. A pole may be used to trip the twistlocks 30 on the second and third high containers 18 of a stack 31.

An advantage of the aforementioned system of the present invention is that it does not require expensive overhead cranes or elaborate site preparation; the method can be conducted at almost any location where a sufficient space is present to enable the ramp 16 to be firmly supported.

While the method and apparatus disclosed herein constitute preferred embodiments of the invention, the invention is not limited to this precise method and apparatus, and other methods and devices may be used without departing from the scope of the invention.

What is claimed is:

1. A method of loading containers comprising the steps of:
    selecting a plurality of containers adapted to contain and protect freight in a marine environment, each container having a set of outer walls defining an inner volume;
    loading freight into said inner volume;
    providing a reach stacker including a body portion and a gripping portion including a spreader attachment, said gripping portion being capable of being raised and lowered, rotated, and inclined relative to said body portion;
    accessing a marine vessel, wherein said marine vessel has a beam at least about ¼ of its length to provide a relatively stable marine vessel;
    individually lifting and transporting each container along or adjacent to an upper edge thereof by means of said reach stacker over a ramp to a storage deck of said marine vessel, said ramp and storage deck having sufficient strength to support said reach stacker when said reach stacker is transporting a fully loaded one of said containers;
    positioning each container at desired locations on said deck by means of said reach stacker for transportation by said marine vessel; and
    securing each container to said deck at said locations.

2. The method of claim 1 wherein said securing step includes securing said containers to said deck by semiautomatic twistlocks.

3. The method of claim 2 wherein said positioning step includes the step of arranging said containers in vertical stacks on said deck.

4. The method of claim 3 wherein said securing step includes the step of securing said containers in vertical stacks to each other by means of semiautomatic twistlocks.

5. The method of 4 further comprising the step of off-loading said containers from said vessel at said destination site by said reach stacker.

6. The method of claim 1 wherein said lifting and transporting step includes grasping each of said containers by said reach stacker, and wherein the method further includes the step of releasing said containers after said positioning step.

7. The method of claim 1 wherein each container includes a pair of opposed receptacles, and wherein said spreader attachment is received in said receptacles during said lifting and transporting step.

8. The method of claim 1 wherein said lifting and transporting step including gripping each container at or adjacent to said upper edge.

9. The method of claim 1 wherein said lifting and positioning steps include moving said gripping portion relative to said body portion, and wherein said lifting and positioning steps are carried out without the use of any outrigger supports.

10. The method of claim 9 wherein said lifting and positioning steps include extending a boom of said reach stacker.

11. The method of claim 1 wherein said reach stacker does not include any outrigger supports.

12. The method of claim 1 wherein said storage deck has a strength of approximately 1,750 pounds per square foot.

13. The method of claim 1 wherein said ramp has a length approximately 75 feet to reduce the angle of inclination of the ramp.

14. The method of claim 1 wherein said marine vessel is a barge and has a pointed bow.

15. The method of claim 1 wherein said lifting and transporting step includes individually lifting each container off of a tractor-trailer or a rail car.

16. The method of claim 1 wherein said marine vessel has a beam of about ¼ its length to provide a relatively stable marine vessel.

17. A method of offloading containers comprising the steps of:

accessing a marine vessel, wherein said marine vessel has a beam at least about ¼ of its length to provide a relatively stable marine vessel;

selecting a plurality of containers adapted to contain and protect freight in a marine environment located on a storage deck of a said marine vessel, each container having a set of outer walls defining an inner volume and having freight loaded therein;

providing a reach stacker including a body portion and a gripping portion including a spreader attachment, said gripping portion being capable of being raised and lowered, rotated, and inclined relative to said body portion;

individually lifting and transporting each container along or adjacent to an upper edge thereof by means of said reach stacker over a ramp from said storage deck of said marine vessel, said ramp and storage deck having sufficient strength to support said reach stacker when said reach stacker is transporting a fully loaded one of said containers;

placing each container at desired locations on an associated dock by said reach stacker.

18. The method of claim 17 wherein said lifting and placing steps include moving said gripping portion relative to said body portion, and wherein said lifting and placing steps are carried out without the use of any outrigger supports.

19. The method of claim 18 wherein said lifting and placing steps include extending a boom of said reach stacker.

20. The method of claim 17 wherein said reach stacker does not include any outrigger supports.

21. The method of claim 17 wherein said storage deck has a strength of approximately 1,750 pounds per square foot.

22. The method of claim 17 wherein said ramp has a length of approximately 75 feet to reduce the angle of inclination of the ramp.

23. The method of claim 17 wherein said marine vessel is a barge and has a pointed bow.

24. The method of claim 17 wherein said placing step includes placing each container on a vehicle by said reach stacker.

25. The method of claim 17 wherein said marine vessel has a beam of about ¼ of its length to provide a relatively stable marine vessel.

26. A method of transporting containers comprising the steps of:

selecting a plurality of containers adapted to contain and protect freight in a marine environment, each container having a set of outer walls defining an inner volume and having freight loaded therein;

providing a reach stacker including a body portion and a gripping portion including a spreader attachment, said gripping portion being capable of being raised and lowered relative to said body portion;

accessing a marine vessel, wherein said marine vessel has a beam at least about ¼ of its length to provide a relatively stable marine vessel;

lifting a container along or adjacent to an upper edge thereof by means of said reach stacker;

causing said reach stacker to travel over a ramp to or from a storage deck of said marine vessel, said ramp and storage deck having sufficient strength to support said reach stacker when said reach stacker is transporting a fully loaded one of said containers;

positioning said container at a desired location on a support surface of said vessel or a dock by means of said reach stacker; and repeating said lifting, causing and positioning steps for each of said plurality of containers.

27. The method of claim 26 further comprising the step of releasing said container from said reach stacker after said positioning step.

28. The method of claim 26 wherein each container includes a bottom, a roof, and a plurality of side walls extending between said bottom and said roof to thereby define said inner volume.

29. The method of claim 26 further comprising the steps of securing said containers to said support surface at said locations, and towing said marine vessel with said containers secured to said support surface thereof to a destination site.

30. The method of claim 29 wherein said marine vessel includes a pointed bow to improve the efficiency of said towing step.

31. The method of claim 26 wherein said lifting and positioning steps include moving said gripping portion relative to said body portion, and wherein said lifting and positioning steps are carried out without the use of any outrigger supports.

32. The method of claim 31 wherein said lifting and positioning steps include extending a boom of said reach stacker.

33. The method of claim 26 wherein said reach stacker does not include any outrigger supports.

34. The method of claim 26 wherein said positioning step includes stacking said containers at least three containers high.

35. The method of claim 26 wherein said storage deck has a strength of approximately 1,750 pounds per square foot.

36. The method of claim 26 wherein said ramp has a length of approximately 75 feet to reduce the angle of inclination of the ramp.

37. The method of claim 26 further wherein said marine vessel is a barge and has a pointed bow.

38. The method of claim 26 wherein said lifting step includes lifting each container off of a tractor-trailer or a rail car by said reach stacker, and wherein said causing step includes causing said reach stacker to travel over said ramp to said storage deck of said marine vessel.

39. The method of claim 26 wherein said marine vessel has a beam of about ¼ of its length to provide a relatively stable marine vessel.

* * * * *

UNITED STATES PATENT AND TRADEMARK OFFICE
CERTIFICATE OF CORRECTION

PATENT NO. : 7,341,422 B1  Page 1 of 1
APPLICATION NO. : 09/057313
DATED : March 11, 2008
INVENTOR(S) : John D. McCown et al.

It is certified that error appears in the above-identified patent and that said Letters Patent is hereby corrected as shown below:

On the title page Item (75) Inventors

Second Inventor's surname should read --McLean--.

Column 6

Line 28, Insert -- claim -- before "4".
Line 57, Insert -- of -- after "length".
Line 66, Insert -- of -- after "1/4".

Column 7

Line 8, Delete "a" after "of".

Column 8

Line 47, Delete "further" after "26".

Signed and Sealed this

Twenty-sixth Day of August, 2008

JON W. DUDAS
*Director of the United States Patent and Trademark Office*